United States Patent
Kern et al.

(10) Patent No.: US 10,956,822 B1
(45) Date of Patent: Mar. 23, 2021

(54) IDENTIFICATION AND MANAGEMENT OF FREQUENTLY ASKED QUESTIONS

(71) Applicant: Wells Fargo Bank, N.A., San Francisco, CA (US)

(72) Inventors: Daniel Kern, Charlotte, NC (US); Misty Ritchie, Cramerton, NC (US); Qiyi Lu, Charlotte, NC (US)

(73) Assignee: WELLS FARGO BANK, N.A., San Francisco, CA (US)

( * ) Notice: Subject to any disclaimer, the term of this patent is extended or adjusted under 35 U.S.C. 154(b) by 860 days.

(21) Appl. No.: 15/642,961

(22) Filed: Jul. 6, 2017

(51) Int. Cl.
  *G06N 20/00* (2019.01)
  *G06N 5/02* (2006.01)
  *G06F 40/205* (2020.01)
  *G06F 40/247* (2020.01)
  *G06F 40/289* (2020.01)

(52) U.S. Cl.
  CPC ............ *G06N 5/02* (2013.01); *G06F 40/205* (2020.01); *G06F 40/247* (2020.01); *G06F 40/289* (2020.01); *G06N 20/00* (2019.01)

(58) Field of Classification Search
  CPC .................. G06F 16/3329; G06F 16/3331
  USPC ........................................ 706/15, 45
  See application file for complete search history.

(56) References Cited

U.S. PATENT DOCUMENTS

| | | | |
|---|---|---|---|
| 2005/0102221 A1* | 5/2005 | Sulkowski | G06Q 40/02 705/38 |
| 2014/0201126 A1* | 7/2014 | Zadeh | A61B 5/165 706/52 |
| 2016/0132773 A1* | 5/2016 | Chandrasekaran | G06F 16/24578 706/11 |
| 2018/0113867 A1* | 4/2018 | Erpenbach | G06F 16/243 |
| 2018/0150607 A1* | 5/2018 | MacLeod | G16H 10/20 |
| 2018/0182029 A1* | 6/2018 | Vinay | G06Q 40/025 |
| 2018/0336183 A1* | 11/2018 | Lee | G06F 40/30 |
| 2018/0373699 A1* | 12/2018 | McAteer | G06F 16/9024 |
| 2019/0051204 A1* | 2/2019 | Jang | G06F 16/9535 |
| 2020/0038748 A1* | 2/2020 | Wu | A63F 13/87 |

* cited by examiner

*Primary Examiner* — David R Vincent
(74) *Attorney, Agent, or Firm* — Walter Haverfield LLP; James J. Pingor

(57) ABSTRACT

The innovation disclosed and claimed herein, in one aspect thereof, comprises systems and methods of managing regulatory questions. The systems and methods receive a question having words and phrases. The systems and methods identify keywords in the question using a knowledgebase. The systems and methods determine closely related questions based on the identification, the closely related questions having answers associated with each question of the closely related questions. The systems and methods perform machine learning on the answers of the determined closely related questions.

19 Claims, 6 Drawing Sheets

IDENTIFICATION AND MANAGEMENT OF FREQUENTLY ASKED QUESTIONS

BACKGROUND

Financial institutions use models to create forecasts and make business decisions. Models have come under a high level of scrutiny. Models are subject to review by internal audit entities and external regulators such as the Federal Reserve Bank (FRB) and the Office of the Comptroller of the Currency (OCC). The audit and external regulators examine many aspects of the financial institution models, such as development, use, validation, and/or the like. Examinations typically include rounds of questions where the financial institution provides written responses to the regulator and/or auditor. The questions may include almost any aspect of models. The questions can originate from different regulators regarding the same model. The regulators typically request a short term to receive answers. It is important with communications with audit, regulators and other stakeholders that responses to regulator questions are correct, consistent, and are based on the most up-to-date information in order to ensure credibility.

The questions are directed to and answered on a question by question basis by a representative such as a developer, a validator, a CFMO, a CMoR, and/or the like. The questions can be directed to many different entities such as developers and validators. Questions and question sets are oftentimes tailored to the specific entity being questioned such that different questions may be asked depending on the answering entity.

BRIEF SUMMARY OF THE DESCRIPTION

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in one aspect thereof, comprises systems and methods of managing regulatory questions. A system of the innovation can include a request component that receives a question having words and phrases. The system can include an identification component that identifies keywords in the question using a knowledgebase. The system further includes a determination component that determines closely related questions based on the identification, the closely related questions having answers associated with each question of the closely related questions.

A method of the innovation can begin by receiving a question from a regulator. The question is analyzed to identify keywords. The question is converted into a keyword vector. Similarity scores are calculated between the question and stored questions in the knowledgebase. The stored questions with the highest similarity scores are ranked. A stored question is selected based on the ranking and/or similarity score. The stored answer is submitted as the answer to the received question.

In aspects, the subject innovation provides substantial benefits in managing regulator questions. One advantage resides in a reduction of response time to regulator questions. Another advantage resides in better institutional knowledge via machine learning.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

BRIEF DESCRIPTION OF THE DRAWINGS

Aspects of the disclosure are understood from the following detailed description when read with the accompanying drawings. It will be appreciated that elements, structures, etc. of the drawings are not necessarily drawn to scale. Accordingly, the dimensions of the same may be arbitrarily increased or reduced for clarity of discussion, for example.

DETAILED DESCRIPTION

Figure 1:
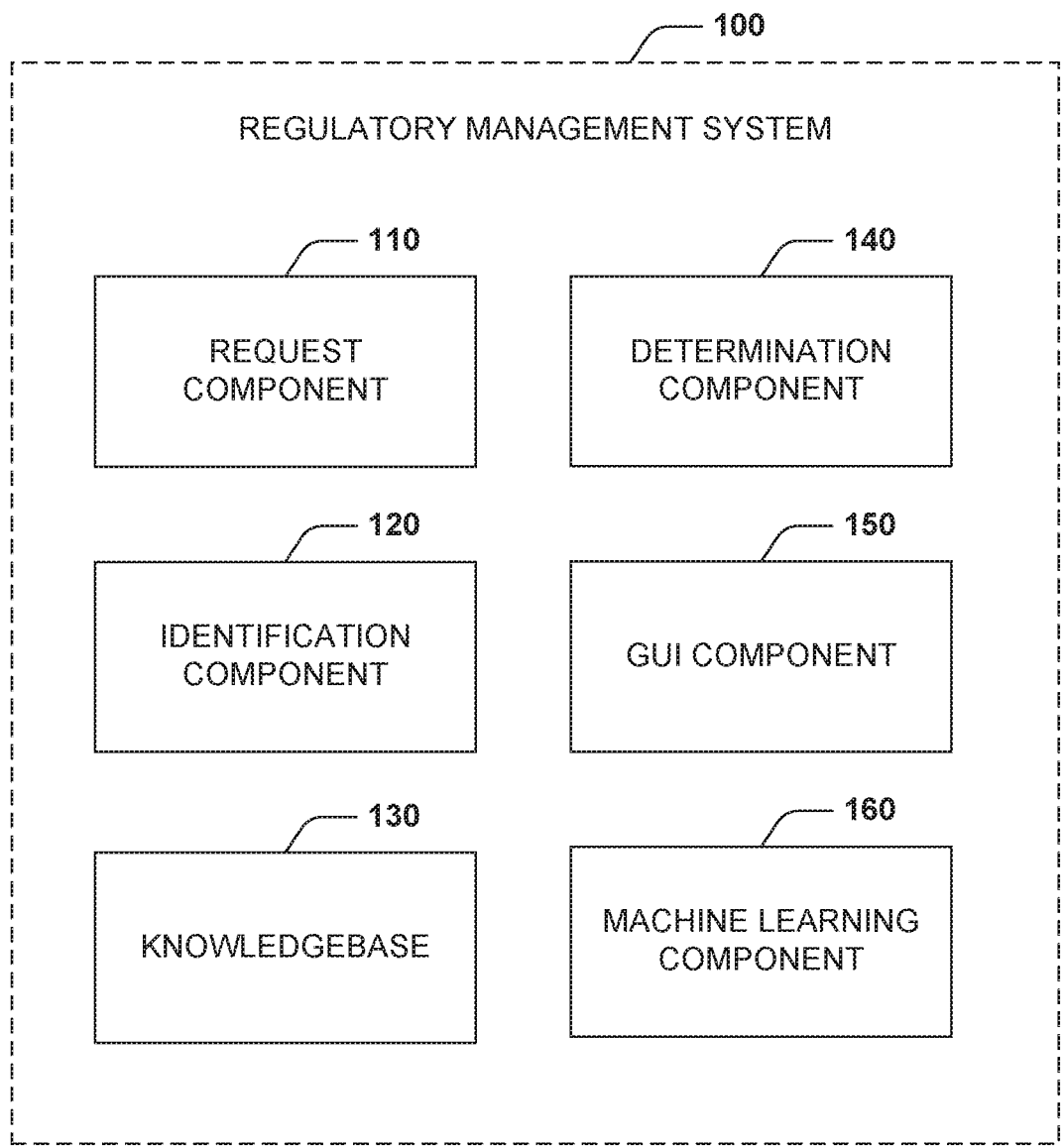
FIG. 1 illustrates an example component diagram of a regulatory management system.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller can be a component. One or more components residing within a process or thread of execution and a component may be localized on one computer or distributed between two or more computers.

Furthermore, the claimed subject matter can be implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

While certain ways of displaying information to users are shown and described with respect to certain figures as screenshots, those skilled in the relevant art will recognize that various other alternatives can be employed. The terms "screen," "web page," "screenshot," and "page" are generally used interchangeably herein. The pages or screens are stored and/or transmitted as display descriptions, as graphical user interfaces, or by other methods of depicting information on a screen (whether personal computer, PDA, mobile telephone, or other suitable device, for example) where the layout and information or content to be displayed on the page is stored in memory, database, or another storage facility.

FIG. 1 illustrates a regulatory management system 100 for managing and answering regulator questions. The system 100 includes a request component 110. The request component 110 receives a question from a regulator or entity. The request component 110 can provide the question to the system 100 via an automated process or user input. In some embodiments, the question is provided by the request component 110 via an automated email, application programming interface (API), program, graphical user interface (GUI), and/or the like. In other embodiments, the questions may be input by a user. In some embodiments, the request component 110 is an automated email address dedicated to receiving emailed questions from regulators. In some embodiments, the request component 110 is part of a network such that the request component 110 can receive questions from devices, users, and/or the like over the network. The network can be a mobile network, wired LAN, wireless LAN, an internet network, or the like to transmit communications. The network can be a corporation wide network that provides online services and/or access to corporate sites and/or information. In some embodiments, the network is a private network serving regulators providing questions and users and/or entities providing answers to the questions.

In some embodiments, the request component 110 receives multiple questions or a series of questions. The question(s) contains words and/or phrases. The regulatory management system 100 includes an identification component 120. The identification component 120 identifies keywords in the question. The identification 120 provides the question to a knowledgebase 130 to be used by a determination component 140.

The determination component 140 determines closely related questions based on the identification. The closely related questions are stored in the knowledgebase 130. In some embodiments, the knowledgebase 130 stores previous questions that have been provided to the regulatory management system 100. In other embodiments, the knowledgebase 130 stores a set of keywords and/or synonyms of keywords to facilitate searching for closely related questions.

The determination component 140 determines a set of closely related questions that are stored in the knowledgebase 130. In some embodiments, the determination component 140 can match the identified keywords in the instant question to keywords in stored questions of the knowledgebase 130. In some embodiments, the knowledgebase 130 stores question answers that are associated with each question of the stored questions. From the determination of closely related questions, the determination component 140 can provide suggested answers to the user to facilitate answering the instant question.

In some embodiments, the regulatory management system 100 can include a graphical user interface (GUI) component 150. The GUI component 150 can be a keyboard, mouse, touchscreen, display, and/or the like to receive input and display information to a user. The GUI component 150 presents a set of potential answers to the instant question based on the output of the determination component 140. The GUI component 150 can receive approval of a selected answer from the set of answers. The GUI component 150 can submit the answer to the requesting authority as a response to the instant question. In some embodiments, the GUI component 150 can generate an email or a document with the answers for transmission to the requesting authority. In some embodiments, the GUI component 150 can receive edits by a user to a proposed answer before submission to the requesting authority. In some embodiments, the GUI component 150 can modify the answer as a text string where the modifications are received by a user to ensure a complete and accurate answer. The knowledgebase 130 stores the submitted answer and associated instant question to facilitate answers to future regulatory questions.

The regulatory management system 100 includes a machine learning component 160. The machine learning component 160 analyzes the knowledgebase 130 and submitted answers to improve selection of answers to future questions. The machine learning component 160 can perform machine learning algorithms for each answer and question pair. In some embodiments, the machine learning component 160 can input, edit, and/or delete answers to new or existing questions based on submitted answers.

In some embodiments, the machine learning component 160 monitors and/or analyzes the knowledgebase 130 to automatically identify systemic risks and/or emerging risks. The machine learning component 160 employs keyword risk scores to identify themes and score the themes. Themes are trends in submitted questions from regulators collected over time. Themes provide insight into the concerns or interests of regulators. In some embodiments, the machine learning component 160 performs the analysis on an ongoing basis to monitor when a theme spreads or emerges. The keyword risk scores can be based on frequency of use in questions, affiliation with other risk ratings, subject matter expertise, and/or the like. In some embodiments, official definitions, policy excerpts, and/or other standard responses can be tagged as keywords or phrases and used in computing keyword risk scores.

The machine learning component 160 can define themes as clusters of similar questions or keywords to facilitate identifying themes. For example, knowledgebase questions with common keywords can be clustered. In some embodiments, the machine learning component 160 can identify systemic risks. The machine learning component 160 can monitor scores of themes across different lines-of-business (LOBs) or products. When the machine learning component 160 determines that a theme affects multiple LOBs, the machine learning component 160 labels the theme as a systemic risk. An alert to the user can be generated and communicated to the user via the GUI component 150.

In some embodiments, the machine learning component 160 can identify emerging risks. The machine learning component 160 monitors theme scores over time to trend themes. The machine learning component 160 can identify themes occurring more frequently in the time period and tag them as emerging risks. In some embodiments, the machine learning component 160 can identify themes that are not occurring as frequently in a time period in contrast to an earlier time period. The machine learning component 160 can label these themes as mitigated risks.

Figure 2:
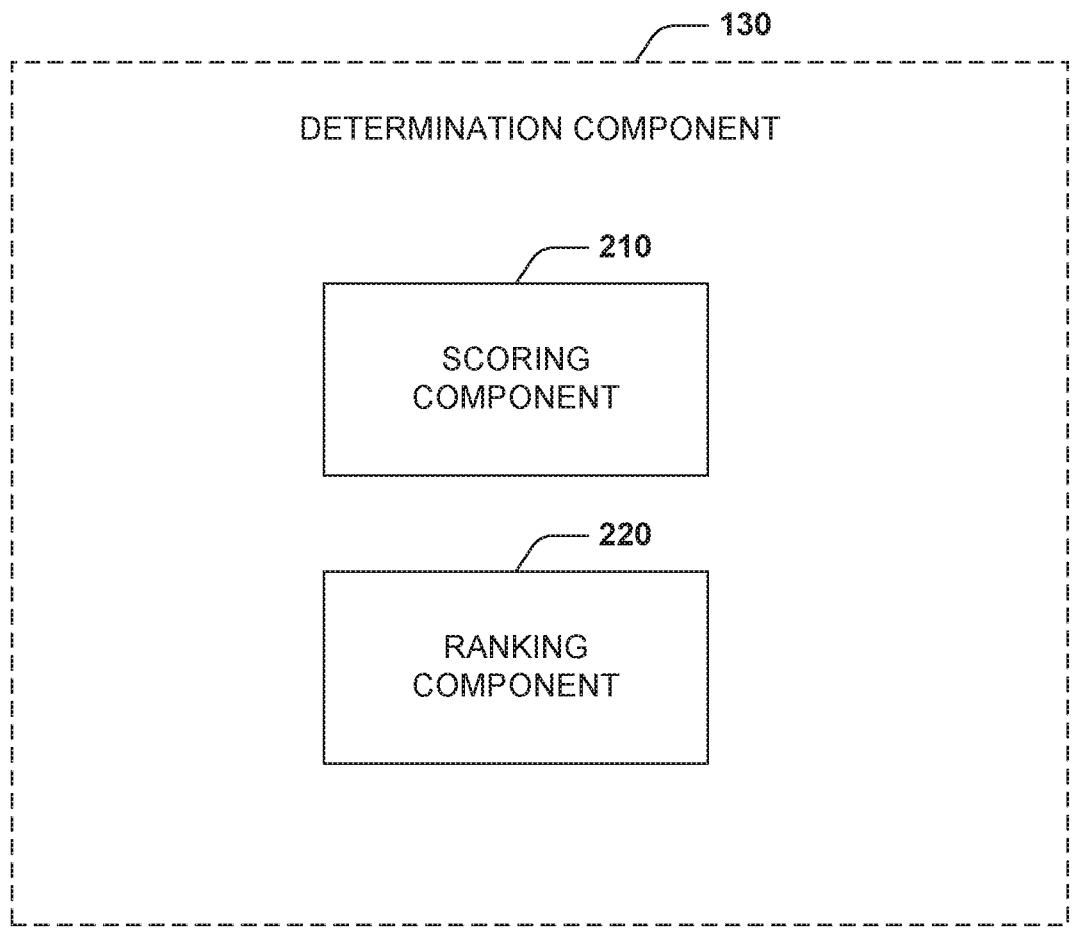
FIG. 2 illustrates an example component diagram of a determination component.

FIG. 2 illustrates a component diagram of the determination component 140 for predicting and/or suggesting answers for regulatory questions received by the regulatory management component 100. The determination component 140 includes a scoring component 210. The scoring component 210 that generates a similarity score for each question in the knowledgebase 130 in comparison to the instant question. In some embodiments, the similarity score may be computed using similarity algorithms and/or the like.

The determination component 140 includes a ranking component 220. The ranking component 220 receives the similarity scores from the scoring component 210 and generates a ranking of answers associated with the knowledgebase 130 questions having the highest similarity scores to the instant question. For example, the ranking component 220 receives the similarity scores from the scoring component 210 and retrieves the answers for the five highest scoring questions in the knowledgebase 130. The ranking component 220 ranks the answers according to the similarity score for the GUI component 150 to present to the user for selection and/or submission.

Figure 3:
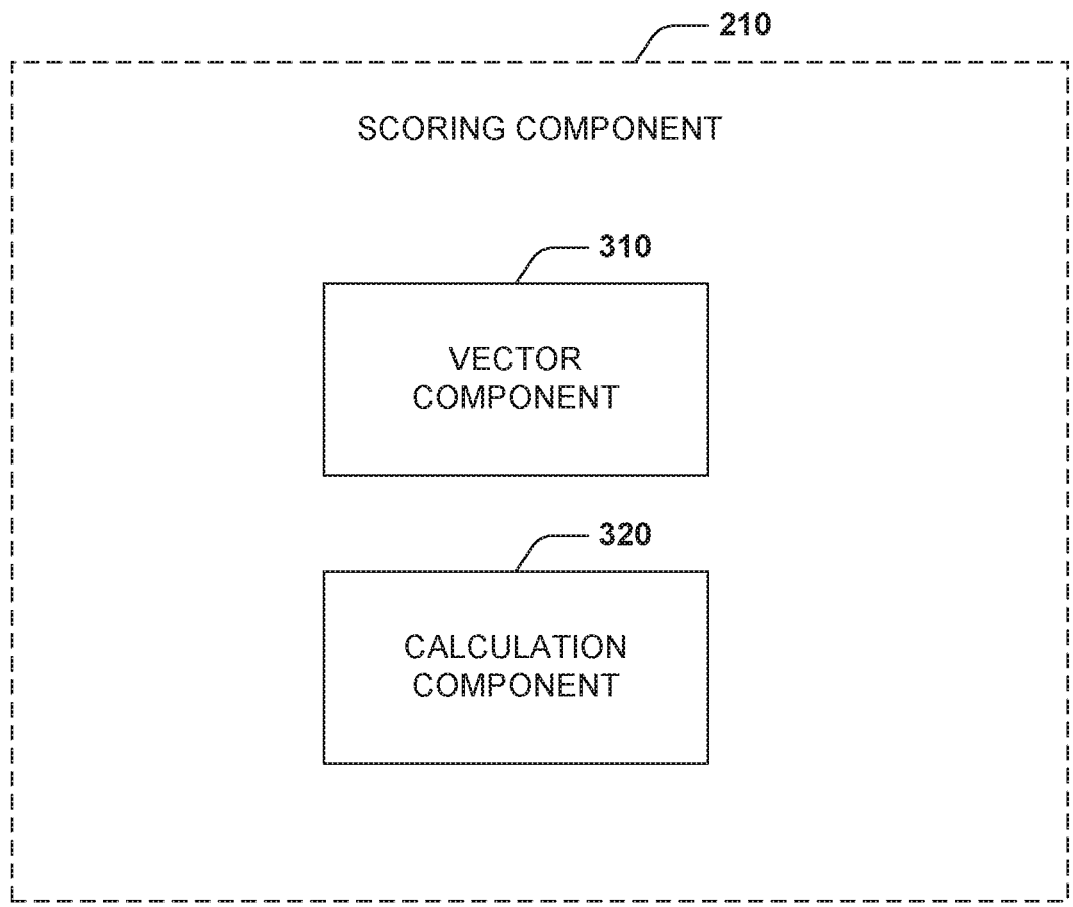
FIG. 3 illustrates an example component diagram of a scoring component.

FIG. 3 illustrates an example component diagram of a scoring component 210 for generating similarity scores to an instant question. In some embodiments, the scoring component 210 includes a vector component 310. The vector component 310 converts the instant question having keywords into a vector representing a keyword count. For example, the question "Describe variable selection process in more detail" includes the keywords identified by the identification component 120 can be "describe," "variable," "selection," and "process." A stored question in the knowledgebase may be "Please describe in detail the variable selection process/criteria for the vintage and age cohort effects included in the final model using student secured originations and core high volume rate models as the example." Where "describe," "variable," "selection," "process," "vintage," "age," "cohort," "secured," and "originations" are identified as keywords. The vector component 310 converts the questions into vectors to compare the instant question with stored questions. The vectors are represented as

| ID | age | process | selection | variable | vintage | origination | cohort | explain | secured |
|---|---|---|---|---|---|---|---|---|---|
| 111 | 0 | 1 | 1 | 1 | 0 | 0 | 0 | 1 | 0 |
| 222 | 1 | 1 | 1 | 1 | 1 | 1 | 1 | 1 | 1 |

Where each row is a vector for a question having a question ID, and each cell contains the count or number of instances the keyword appears in that question. In some embodiments, synonyms of keywords are used to find a greater amount of questions in the knowledgebase 130.

The scoring component 210 includes a calculation component 320. The calculation component 320 determines measures of distances and similarity between the vector of the instant question created by the vector component 310 and questions in the knowledgebase 130. In some embodiments, the calculation component 320 determines a cosine similarity between vectors. The measures of distance and similarity can be shown in an output to the user. For example, the output can be depicted as

| ID Pair | Distance | Cosine Similarity | Num Common | Common KW |
|---|---|---|---|---|
| [111],[222] | 0.00 | 1.00 | 4 | process; selection; variable; explain |
| [222],[111] | 2.24 | 0.67 | 4 | process; selection; variable; explain | where the distance between vectors are shown along with the cosine similarity, number of common keywords, and a listing of the common keywords. The output can be presented to the user via the GUI component 150.

Figure 4:
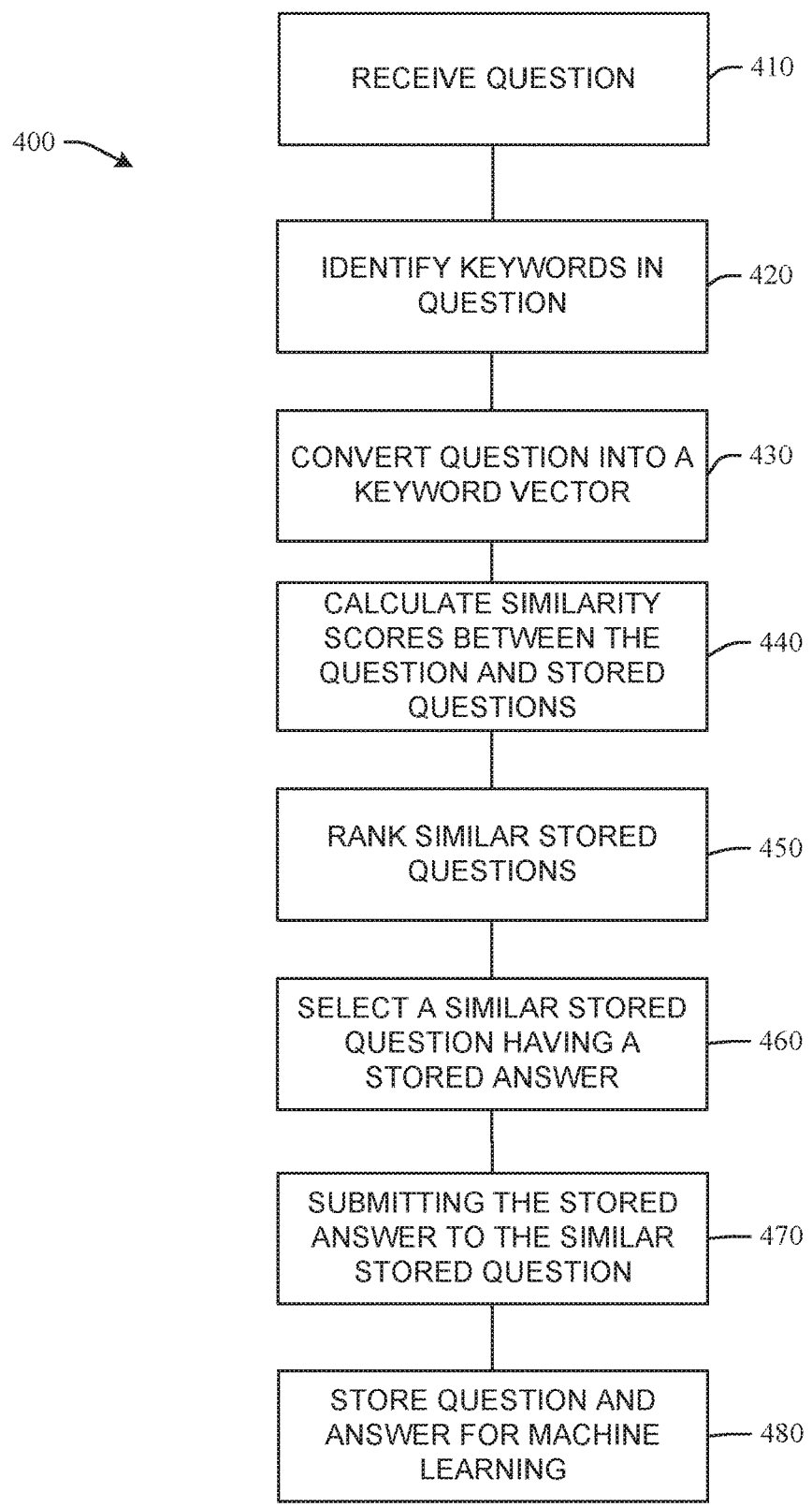
FIG. 4 illustrates a method for answering questions.

With reference to FIG. 4, example methods 400 are depicted for authenticating a user to verify identity. While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. It is also appreciated that the method 400 are described in conjunction with a specific example is for explanation purposes.

FIG. 4 illustrates a method 400 for managing regulatory questions. At 410, a question is received. For example, a regulator communicates a question about a risk model. At 420, the question is analyzed to identify keywords. In the example, each word in the question is checked against a knowledgebase that stores past keywords such as "variable," or "process" to determine if they appear in the question. The knowledgebase can maintain an up-to-date keyword list or database to use for identification of keywords in new questions.

At 430, the question is converted into a keyword vector. The vector is includes each identified keyword in the question and is generated as described above. At 440, similarity scores are calculated between the question and stored questions in the knowledgebase. The similarity scores can be a vector distance, cosine similarity, an aggregate of multiple similarity metrics, a weighted or non-weighted average of multiple similarity metrics, and/or the like. At 450, the stored questions with the highest similarity scores are ranked. At 460, a stored question is selected based on the ranking and/or similarity score. The stored questions have associated answers for each question that are stored in the knowledgebase. The answer to the selected stored question that is most similar to the received question can be selected. In some embodiments, the answer may not be entirely responsive to the instant question. In such embodiments, the answer can be presented to a user to confirm, modify, and/or edit the selected answer. In other embodiments, a set of answers may be presented to the user and can be selected and modified by the user. At 470, the answer is submitted as the answer to the received question. At 480, the instant question and the answer provided are stored in the knowledgebase and applied to machine learning algorithms. The machine learning facilitates future questions that may be submitted by regulators.

Figure 5:
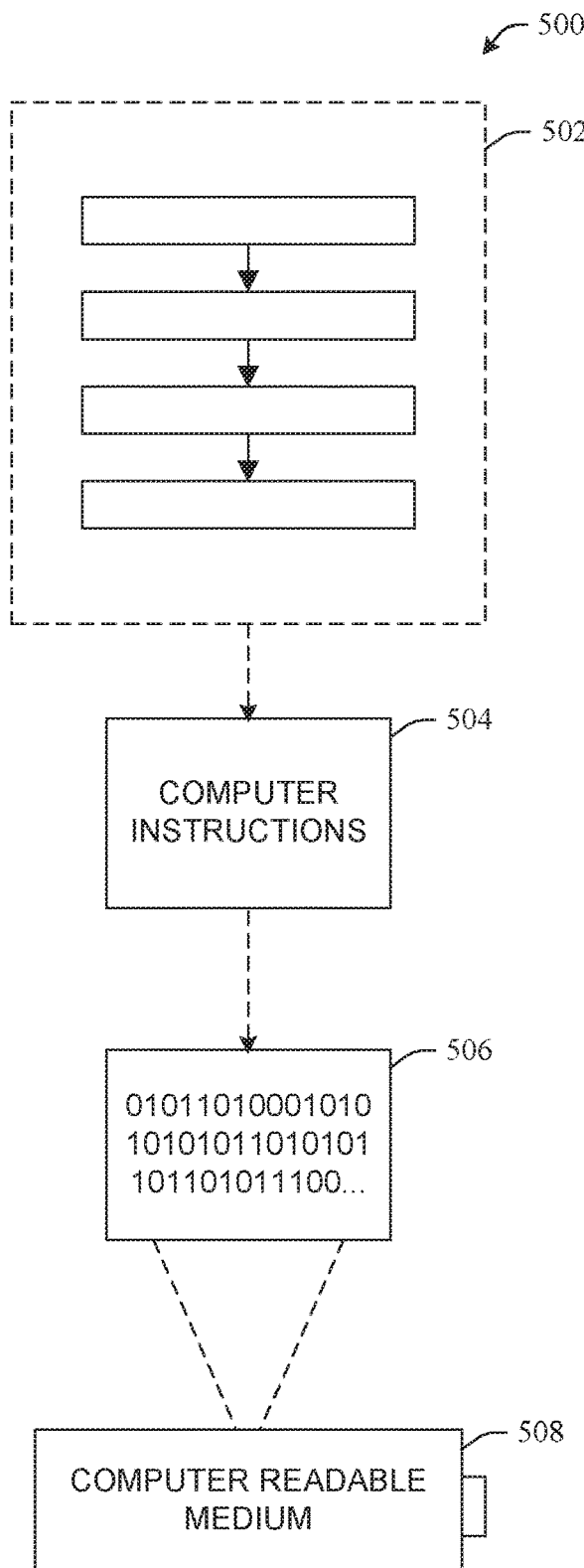
FIG. 5 illustrates a computer-readable medium or computer-readable device comprising processor-executable instructions configured to embody one or more of the provisions set forth herein, according to some embodiments.

Still another embodiment can involve a computer-readable medium comprising processor-executable instructions configured to implement one or more embodiments of the techniques presented herein. An embodiment of a computer-readable medium or a computer-readable device that is devised in these ways is illustrated in FIG. 5, wherein an implementation 500 comprises a computer-readable medium 508, such as a CD-R, DVD-R, flash drive, a platter of a hard disk drive, etc., on which is encoded computer-readable data 506. This computer-readable data 506, such as binary data comprising a plurality of zero's and one's as shown in 506, in turn comprises a set of computer instructions 504 configured to operate according to one or more of the principles set forth herein. In one such embodiment 500, the processor-executable computer instructions 504 is configured to perform a method 502, such as at least a portion of one or more of the methods described in connection with embodiments disclosed herein. In another embodiment, the processor-executable instructions 504 are configured to implement a system, such as at least a portion of one or more of the systems described in connection with embodiments disclosed herein. Many such computer-readable media can be devised by those of ordinary skill in the art that are configured to operate in accordance with the techniques presented herein.

Figure 6:
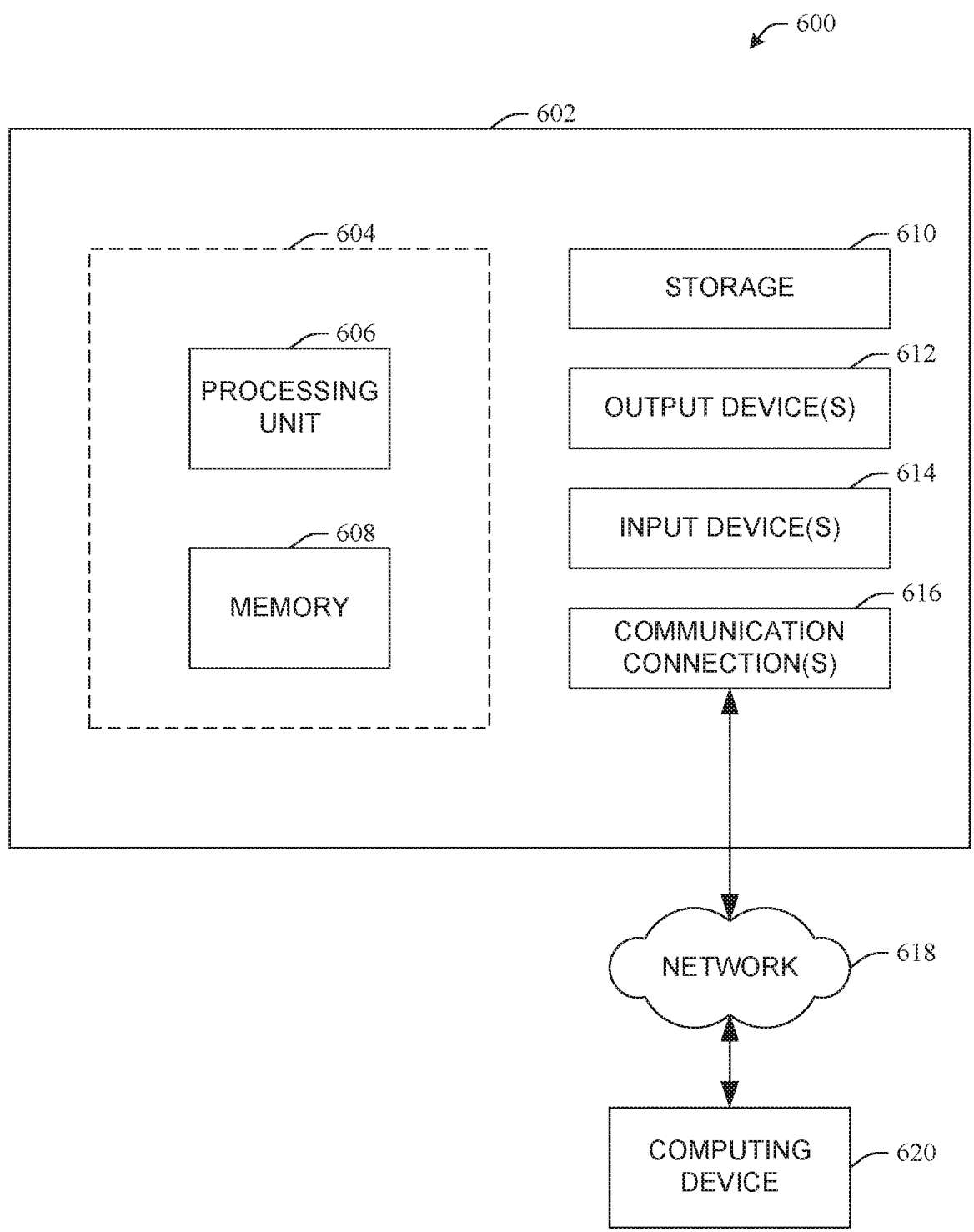
FIG. 6 illustrates a computing environment where one or more of the provisions set forth herein can be implemented, according to some embodiments.

With reference to FIG. 6 and the following discussion provide a description of a suitable computing environment in which embodiments of one or more of the provisions set forth herein can be implemented. The operating environment of FIG. 6 is only one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, tablets, and the like, multiprocessor systems, consumer electronics, mini computers, mainframe computers, distributed computing environments that include any of the above systems or devices, and the like.

Generally, embodiments are described in the general context of "computer readable instructions" being executed by one or more computing devices. Computer readable instructions are distributed via computer readable media as will be discussed below. Computer readable instructions can be implemented as program modules, such as functions, objects, Application Programming Interfaces (APIs), data structures, and the like, that perform particular tasks or implement particular abstract data types. Typically, the functionality of the computer readable instructions can be combined or distributed as desired in various environments.

FIG. 6 illustrates a system 600 comprising a computing device 602 configured to implement one or more embodiments provided herein. In one configuration, computing device 602 can include at least one processing unit 606 and memory 608. Depending on the exact configuration and type of computing device, memory 608 may be volatile, such as RAM, non-volatile, such as ROM, flash memory, etc., or some combination of the two. This configuration is illustrated in FIG. 6 by dashed line 604.

In these or other embodiments, device 602 can include additional features or functionality. For example, device 602 can also include additional storage such as removable storage or non-removable storage, including, but not limited to, magnetic storage, optical storage, and the like. Such additional storage is illustrated in FIG. 6 by storage 610. In some embodiments, computer readable instructions to implement one or more embodiments provided herein are in storage 610. Storage 610 can also store other computer readable instructions to implement an operating system, an application program, and the like. Computer readable instructions can be accessed in memory 608 for execution by processing unit 606, for example.

The term "computer readable media" as used herein includes computer storage media. Computer storage media includes volatile and nonvolatile, non-transitory, removable and non-removable media implemented in any method or technology for storage of information such as computer readable instructions or other data. Memory 608 and storage 610 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 602. Any such computer storage media can be part of device 602.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Device 602 can include one or more input devices 614 such as keyboard, mouse, pen, voice input device, touch input device, infrared cameras, video input devices, or any other input device. One or more output devices 612 such as one or more displays, speakers, printers, or any other output device can also be included in device 602. The one or more input devices 614 and/or one or more output devices 612 can be connected to device 602 via a wired connection, wireless connection, or any combination thereof. In some embodiments, one or more input devices or output devices from another computing device can be used as input device(s) 614 or output device(s) 612 for computing device 602. Device 602 can also include one or more communication connections 616 that can facilitate communications with one or more other devices 620 by means of a communications network 618, which can be wired, wireless, or any combination thereof, and can include ad hoc networks, intranets, the Internet, or substantially any other communications network that can allow device 602 to communicate with at least one other computing device 620.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
one or more processors having one or more instructions comprising:
receiving a question having words and phrases;
identifying keywords in the question using a knowledgebase;
determining a set of related questions based on the identification, the set of related questions are associated with a corresponding set of answers to each question of the set of related questions;
performing machine learning on the question, the set of related questions, and answers of the determined set of related questions; and
identifying a systemic risk based on the machine learning of the set of related questions received over a time period, wherein identifying the systemic risk comprises:
determining keyword risk scores based on the identified keywords in the question and instances of the keywords in the set of related questions;
identifying themes based on the keyword risk scores; and
determining the systemic risk based on the identified themes and analysis of the identified themes across two or more lines of business of a financial institution.

2. The method of claim 1, wherein the determining comprises:
calculating a similarity score for each question in the set of related question; and
selecting an answer associated with a highest scoring question as the answer to the received question.

3. The method of claim 2, wherein the scoring comprises:
converting the question into a vector of keywords or phrases.

4. The method of claim 3, comprising:
calculating a distance score between the vector of the question and vectors of the set of related questions stored in the knowledgebase.

5. The method of claim 3, wherein the vector includes a count of each keyword or phrase in the question.

6. The method of claim 2, comprising:
approving the selected answer by a user for submission; and
submitting the selected answer to a requesting authority.

7. The method of claim 6, comprises:
storing the submitted answers and question in the knowledgebase; and
performing machine learning on the stored answers and questions in the knowledgebase to facilitate answering future questions.

8. The method of claim 1, wherein the set of related questions and associated answers are stored in the knowledgebase.

9. The method of claim 1, wherein the converting includes:
parsing the words and phrases against the knowledgebase, the knowledgebase including synonyms and similar keywords or phrases.

10. The method of claim 1, comprising:
receiving an inquiry having a set of questions; and
iteratively answering each question of the set of questions by determining the set of related questions and associated answers.

11. A system, comprising:
one or more processors having instructions to control one or more components, comprising:
a request component that receives a question having words and phrases;
an identification component that identifies keywords in the question using a knowledgebase;
a determination component that determines a set of related questions based on the identification, the set of related questions are associated with a corresponding set of answers to each question of the set of related questions; and
a machine learning component that:
performs machine learning on the question, the set of related questions, and answers of the determined set of related questions; and
identifies a systemic risk based on the machine learning of the set of related questions received over a time period, wherein identifying the systemic risk comprises:
determining keyword risk scores based on the identified keywords in the question and instances of the keywords in the set of related questions;
identifying themes based on the keyword risk scores; and
determining the systemic risk based on the identified themes and analysis of the identified themes across two or more lines of business of a financial institution.

12. The system of claim 11, wherein the determination component comprises:
a scoring component that calculates a similarity score for each question of the set of related questions; and
a rank component that selects an answer associated with a highest scoring question as the answer to the received question.

13. The system of claim 12, wherein the scoring comprises:
a vector component that converts the question into a vector of keywords or phrases.

14. The system of claim 13, comprising:
a calculation component that calculates a distance score between the vector of the question and vectors of the set of related questions stored in the knowledgebase, wherein the vector includes a count of each keyword or phrase in the question.

15. The system of claim 12, comprising:
a graphical user interface to:
receive approval of the selected answer for submission; and
submit the selected answer to a requesting authority.

16. The system of claim 15, wherein the knowledgebase stores the submitted answers for future questions.

17. The system of claim 16, comprising:
wherein the machine learning component analyzes the knowledgebase and submitted answers to improve selection of answers for future questions.

18. The system of claim 11, comprising:
wherein the identification component parses the words and phrases against the knowledgebase, the knowledgebase including synonyms and similar keywords or phrases.

19. A non-transitory computer readable medium having instructions to control one or more processors configured to:

receive a question having words and phrases;
identify keywords in the question using a knowledgebase;
determine a set of related questions based on the identification, the set of related questions are associated with a corresponding set of answers to each question of the set of related questions;
perform machine learning on the question, the set of related questions, and answers of the determined set of related questions; and
identify a systemic risk based on the machine learning of the set of related questions received over a time period, wherein identifying the systemic risk comprises:
determining keyword risk scores based on the identified keywords in the question and instances of the keywords in the set of related questions;
identifying themes based on the keyword risk scores; and
determining the systemic risk based on the identified themes and analysis of the identified themes across two or more lines of business of a financial institution.

\* \* \* \* \*